US008722270B2

(12) United States Patent
Pastula et al.

(10) Patent No.: US 8,722,270 B2

(45) Date of Patent: May 13, 2014

(54) FUEL CELL SHUTDOWN WITH STEAM PURGING

(75) Inventors: Michael Pastula, Calgary (CA); James Smith, Calgary (CA); Quincy Yueh Feng Chiang, Calgary (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 355 days.

(21) Appl. No.: 13/006,526

(22) Filed: Jan. 14, 2011

(65) Prior Publication Data

US 2011/0111310 A1 May 12, 2011

Related U.S. Application Data

(62) Division of application No. 10/907,767, filed on Apr. 14, 2005, now Pat. No. 7,892,687.

(60) Provisional application No. 60/521,391, filed on Apr. 15, 2005.

(51) Int. Cl.
*H01M 8/04* (2006.01)

(52) U.S. Cl.
CPC .................... *H01M 8/04231* (2013.01)
USPC .................... 429/448

(58) Field of Classification Search
CPC .................... H01M 8/04231
See application file for complete search history.

(56) References Cited

U.S. PATENT DOCUMENTS

| | | | |
|---|---|---|---|
| 2,602,702 | A | 7/1952 | Kovach |
| 4,946,750 | A | 8/1990 | Nomden et al. |
| 5,394,623 | A | 3/1995 | Sewell |
| 6,159,626 | A | 12/2000 | Keskula et al. |
| 6,519,510 | B1 | 2/2003 | Margiott et al. |
| 6,536,551 | B1 | 3/2003 | Tanaka et al. |
| 2002/0025458 | A1 | 2/2002 | Faville et al. |
| 2002/0116872 | A1 | 8/2002 | Edlund et al. |
| 2003/0003332 | A1 | 1/2003 | Sederquist et al. |
| 2004/0106019 | A1 | 6/2004 | Halliop et al. |
| 2004/0115488 | A1 | 6/2004 | Sanagi et al. |
| 2005/0008908 | A1 | 1/2005 | Kaye et al. |

FOREIGN PATENT DOCUMENTS

| | | |
|---|---|---|
| JP | 63254677 | 10/1988 |
| WO | 02061870 | 8/2002 |

OTHER PUBLICATIONS

U.S. Appl. No. 10/907,767, filed Apr. 15, 2005, Pastula et al.

*Primary Examiner* — Maria J Laios
(74) *Attorney, Agent, or Firm* — Bennett Jones LLP

(57) ABSTRACT

The present invention relates to an apparatus for steam purging a solid oxide fuel cell stack. Purging the SOFC stack with steam has a physical flushing effect, removing carbon monoxide containing reformate and free oxygen gas from the anode area thereby reducing the potential for nickel oxide or nickel carbonyl formation.

10 Claims, 2 Drawing Sheets

30
34
32
36

FIG. 1
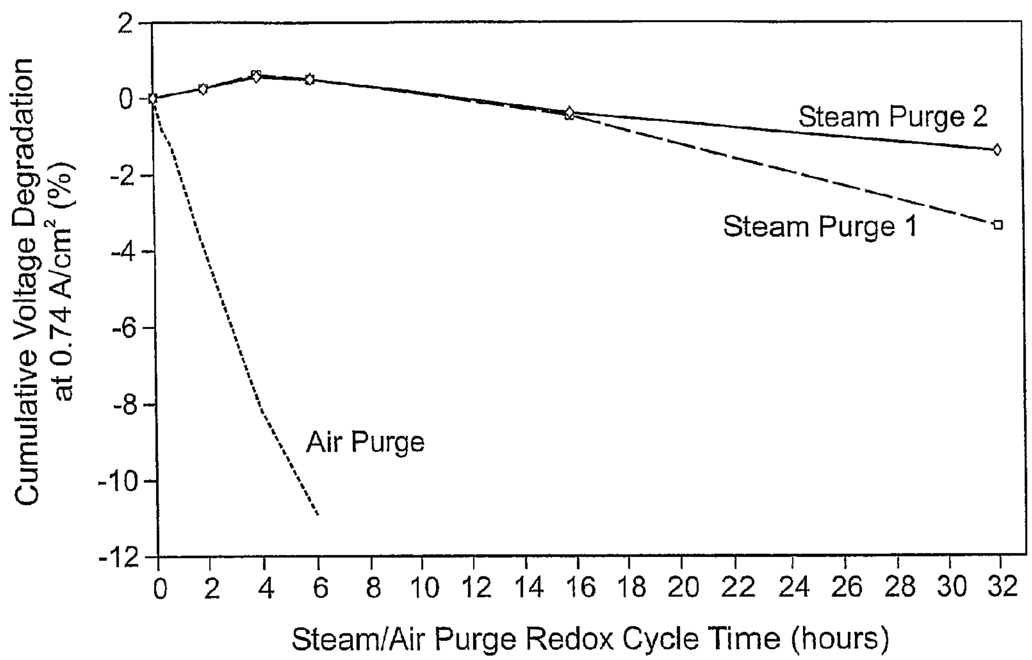
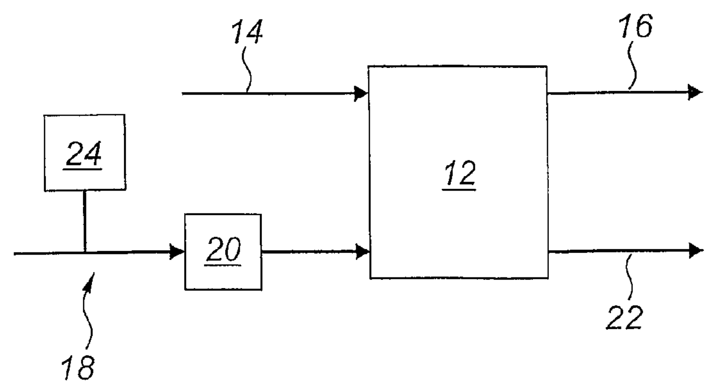
FIG. 2

FUEL CELL SHUTDOWN WITH STEAM PURGING

CROSS REFERENCE TO RELATED APPLICATIONS

The present application is a divisional application of co-pending U.S. patent application Ser. No. 10/907,767 filed on Apr. 14, 2005, which claimed priority from U.S. Provisional Patent Application No. 60/521,391 filed on Apr. 15, 2004, the contents of which are incorporated herein by reference.

FIELD OF THE INVENTION

The invention relates to shutdown methods and systems for high temperature fuel cell systems.

BACKGROUND OF THE INVENTION

The anode of a solid oxide fuel cell (SOFC) typically consists of a porous cermet made of nickel and yttria-stabilized zirconia. The nickel component provides electrical conductivity, electrochemical capability and fuel processing capability. The nickel component also enhances the mechanical properties of the cell. Nickel is a relatively unstable metal at high temperature, and in particular it is unstable in the presence of free oxygen at temperatures above approximately 350° C. At normal SOFC operating temperatures of 600° C. to 1000° C., the anode must be subjected to a reducing atmosphere with a partial pressure of oxygen below the nickel-nickel oxide equilibrium level. This allows the nickel to remain in a reduced metallic state.

During SOFC shut down situations, the propensity of nickel to oxidize can cause structural and operational problems. If the nickel anode oxidizes to form nickel oxide, an increase in volume and weight will occur, introducing large stresses in the anode structure. This can result in physical failure of the anode, the electrolyte, or both. Further, after being converted to nickel oxide, the cell is unable to convert chemical energy into electrical energy efficiently and is considered a failed part.

Additionally, if nickel (or nickel oxide) comes into contact with carbon monoxide at temperatures less than about 230° C., nickel carbonyl may form. This substance is highly toxic and potentially fatal if inhaled. Nickel carbonyl is also highly flammable, and is explosive in certain conditions.

Therefore, during a SOFC system shutdown, it is necessary to protect an anode which contains nickel from oxidation and to prevent carbon monoxide containing gas from contacting the anode at temperatures below 230° C. to ensure that no nickel carbonyl is formed. Currently, a number of strategies are employed to protect the anode and to promote a reducing atmosphere around the anode.

In one strategy, an inert gas, such as nitrogen, containing a small amount of a reducing gas, typically hydrogen, can be continually fed into the cell. This strategy is acceptable if a source of the inert and reducing gas is available and the economics and siting justify its use. In most commercial installations, this is an impractical solution because of the quantity of gas required. An array of 8 fuel cell stacks (2-5 kW) may require 45,000 standard liters of reducing gas for a 15 hour shutdown, for example.

Alternatively, the SOFC can be sealed to prevent any oxidizing gas from entering the system. This latter strategy requires hermetic seals and valves, which is technically very difficult to achieve, requiring complex and expensive engineering.

In another strategy, the anode is protected by applying a voltage across the fuel cell, which results in any oxygen in the anode environment being "pumped" across the membrane to the cathode. Although this system may reliably protect the anode, it requires an external power source which may not always be available, especially during an emergency shutdown situation. Further it does not necessarily avert the problem of nickel carbonyl formation and is only available at temperatures where the electrolyte remains active.

Therefore, there is a need in the art for shutdown methods and systems which prevents or minimizes the formation of nickel carbonyl and prevents or minimizes damage to the cell during shutdown or other conditions where anode oxidation may occur.

SUMMARY OF THE INVENTION

The present invention provides for a method and apparatus for implementing a steam purge of a solid oxide fuel cell stack, in the case of planned or unplanned shutdowns of the stack. Purging the stack with steam has a physical flushing effect, removing carbon monoxide containing reformate and free oxygen gas from the anode area thereby reducing the potential for nickel oxide or nickel carbonyl formation In one aspect, the invention may comprise a solid oxide fuel cell stack including a fuel delivery subsystem comprising a reformer, an air delivery subsystem, and a steam purge subsystem comprising (a) a water chamber or source connected to the fuel delivery subsystem upstream from the reformer;

(b) valve means for controlling flow of water from the water chamber or source into the fuel delivery subsystem; and (c) control means for actuating the valve means.

In another aspect, the invention may comprise a method of shutting down a solid oxide fuel cell stack having a fuel delivery subsystem and an air delivery subsystem, said method comprising the step of purging the fuel delivery subsystem with steam.

BRIEF DESCRIPTION OF THE DRAWINGS

The invention will now be described by way of an exemplary embodiment with reference to the accompanying simplified, diagrammatic, not-to-scale drawings. In the drawings:

FIG. 1 is a graph showing a comparison of the effect of steam purges and air purges on cell performance.

FIG. 2 depicts one embodiment of a fuel cell system of the present invention.

DETAILED DESCRIPTION OF THE INVENTION

Figure 3:
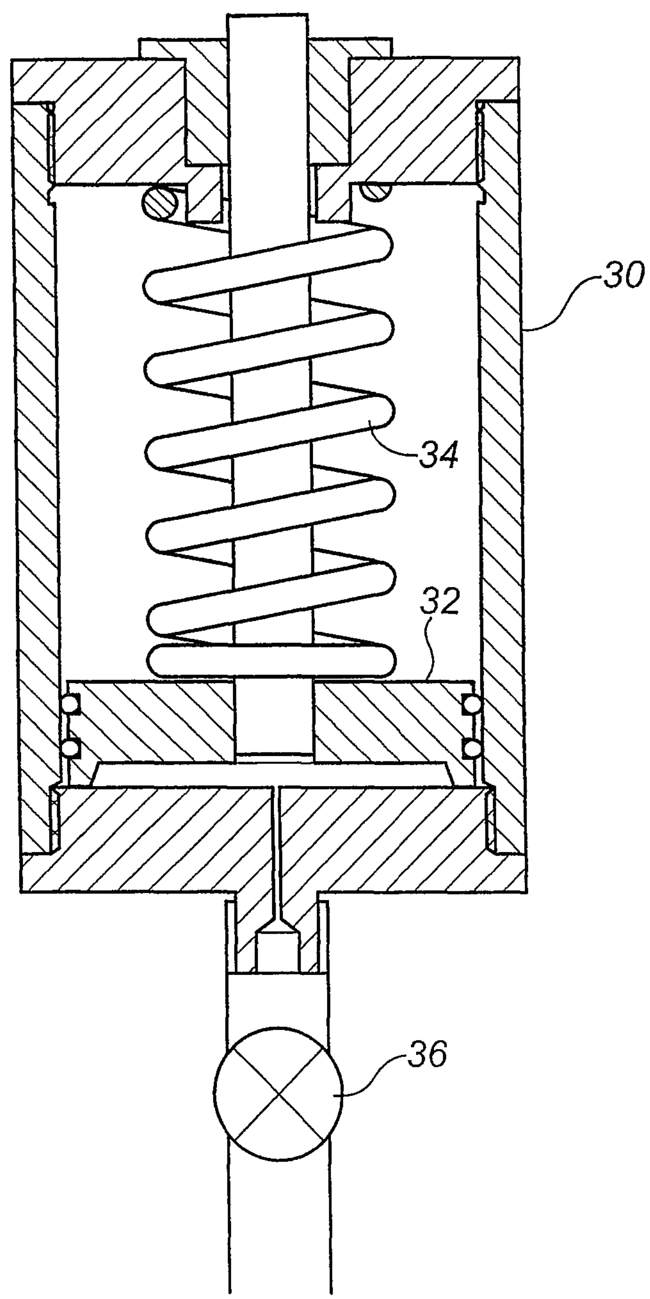
FIG. 3 shows a cross-sectional view of a water injector for implementing a steam purge.

The present invention provides for a method and a system for implementing a planned or unplanned shutdown of a system containing a SOFC stack. In particular, the present invention is directed towards a method and system to prevent undesirable reactions at the anode of a SOFC during the event of a controlled shutdown, or an unplanned shutdown arising from conditions such as fuel loss, or other condition which may lead to an oxidizing atmosphere in the anode. Such undesirable reactions may include the formation of nickel carbonyl or nickel oxide at the anode. When describing the present invention, the following terms have the following meanings, unless indicated otherwise. All terms not defined herein have their common art-recognized meanings.

The term "nickel oxide" includes the product of the reaction in which nickel metal is oxidized to nickel (II) oxide in an oxidizing atmosphere as follows: $2Ni(s)+O_2(g)\rightarrow 2NiO(s)$. Nickel carbonyl means $Ni(CO)_4$, the product of the reaction in which nickel reacts with carbon monoxide. This reaction is used as an industrial process, such as in the production of nickel, and is known as the Mond Process.

The need for a system shutdown may arise for a number of reasons including a controlled shutdown for such things as periodic maintenance, the loss of fuel supply, the loss of control and emergency situations such as the loss of critical power load. Loss of fuel supply may arise due to loss of fuel source, facility fuel delivery hardware failure or alarm condition, or the product fuel delivery subsystem failure, amongst other causes.

In one embodiment, the present invention is directed towards a method and apparatus for steam purging an SOFC stack. Purging with steam may physically displace undesirable gas species such as oxygen and carbon monoxide. Conventionally, steam purging was considered ill-advised for a SOFC stack because steam dissociates at high temperatures, creating an increased oxygen partial pressure and thus an oxidizing atmosphere for nickel.

This was considered likely to damage the anode over periods of time. Surprisingly, we have found that steam purging may be effective. The effect of steam purges on cell performance is compared to air purges in FIG. 1. The graph in FIG. 1 shows that air purges are significantly more damaging to cell performance than steam purges.

In one embodiment, the steam purges are accomplished by positioning the steam injection (or generation) point upstream from a fuel reformer. Additionally, or alternatively, the steam purge may be delayed from the initiation of stack shutdown, allowing the stack to cool down such that the steam purge is conducted at a lower stack temperature.

Under normal operating conditions of the stack, the fuel delivery subsystem provide natural gas-steam reformate, which is used as a fuel to drive the electrochemical reactions in the anode. The table below depicts the typical anode feed composition (shown as fully reformed natural gas) at a steam to carbon molar ratio of 2.6:

TABLE 1

| GAS SPECIES | MOLE FRACTION |
|---|---|
| Hydrogen ($H_2$) | 0.585 |
| Water ($H_2O$) | 0.231 |
| Nitrogen ($N_2$) | .002 |
| Carbon Monoxide (CO) | 0.104 |
| Carbon Dioxide ($CO_2$) | 0.070 |
| Methane ($CH_4$) | 0.009 |

As the reformate stream includes carbon monoxide as a gas species, residual carbon monoxide containing gases may be present at the anode, even after fuel supply to the reformer or stack has been turned off. During shutdown, the system will cool and the anode temperature will gradually decrease from operating temperatures. Nickel will react with carbon monoxide at temperatures below about 230° C. to form nickel carbonyl, which is highly undesirable from a safety perspective and is to be avoided.

Therefore, it important for any shutdown procedure, regardless of whether it is planned or unplanned to protect the anode from oxidation at elevated temperatures, and from exposure to carbon monoxide at reduced temperatures. The reactive nature of the nickel anode creates significant integral safety problems in the event of a SOFC shutdown.

One embodiment of a simplified fuel cell stack system (10) of the present invention is shown schematically in FIG. 2. Oxygen or air is delivered to the stack (12) by means of an air delivery subsystem (14), and is exhausted from the stack through the cathode exhaust (16). Fuel in the form of natural gas is used in a steam reformation process to enrich the fuel stream in hydrogen. The fuel delivery subsystem (18) includes a reformer (20) and is exhausted from the stack (12) through the anode exhaust (22). In preferred embodiments, various heat exchangers and control systems are used to gain thermal efficiencies and control of the stack. For example, the anode and cathode exhausts can be used to preheat the incoming air and fuel. Suitable stack system configurations may be as described in co-owned U.S. patent application Ser. Nos. 09/682,019 or 10/249,772, the contents of which are incorporated herein by reference.

The steam purge unit comprises a water injection system (24) which connects to the fuel delivery subsystem upstream of the reformer. As a result of passive and active heat exchange, the fuel delivery subsystem (18) may be heated well above 200° C. Therefore, when water is injected into the system, it quickly vapourizes and expands quickly in volume. As long as upstream valves are closed and downstream valves are open, the steam generated from water injection will quickly purge the fuel delivery subsystem, the stack anode and exhaust downstream. Steam can be created for extended durations due to the relatively large thermal mass of the stack and the subsystems and thermal communication within the fuel cell hot balance-of-plant components.

As shown in FIG. 3, the water injection system may comprise a housing (30) which may be referred to as an accumulator, a plunger (32) which is sealed within the housing, and biasing means for actuating the plunger. The plunger (32) is suitably sealed within the housing to prevent fluid leaks. In one embodiment, the biasing means comprises a coil spring (34). Alternatively, the biasing means may comprise compressed gas, an elastic bladder or diaphragm or other means to maintain pressurization of the water contained within the housing (30). The outlet from the housing is controlled by a solenoid valve (36) and connects to the fuel delivery subsystem. In standby mode, the plunger (32) will be withdrawn and the housing (30) filled with water, by pump or other means. The valve (36) will be closed as long as power to the valve is available. If a power loss occurs, or if a switch (not shown) is manually or automatically activated, the valve will open and the biasing means will cause the water to be injected into the fuel delivery subsystem. Alternatively, the plunger may be mechanically actuated by a control system (not shown), making the use of biasing means unnecessary or redundant. In a preferred embodiment, the biasing means are retained as a fail safe mechanism whereby the steam purge system may be actuated even in the event of total power loss.

In one embodiment, to commence a normal shutdown and prior to commencing a steam purge, the flow of fuel in the fuel delivery subsystem (18) is reduced to a minimum. A steam purge may be conducted at full operating temperatures, however, because the stability of nickel is related to temperature, it is beneficial to conduct the steam purge once the stack has been cooled from operating temperatures. For example, conducting a steam purge at 250° C. is preferable to a purge at 700° C., as the SOFC material system is more stable. Therefore, in a preferred embodiment, where one has full or partial control of the shutdown procedure, the stack is cooled, or allowed to cool, prior to the steam purge. The steam purge is then conducted prior to the system "off" condition. When implementing such a delayed steam purge, the stack may be cooled in number of ways including pushing cooling air through the air delivery subsystem, using heat exchangers and blowers or by such other suitable means as might be utilized by one skilled in the art. The steam purge may then be initiated upon the stack reaching a predetermined temperature, or after a predetermined length of time. In one embodiment, the steam purge is initiated when the stack reaches a temperature less than about 350° C. and greater than about 230° C. The duration of the steam purge may be controlled manually by an operator, or automatically by an SOFC operating system. In a preferred embodiment, the duration of the steam purge is passively controlled by the amount of water contained in the accumulator housing (30) under pressure, with a fail-safe control valve (36).

The cooling step may be taken with the fuel reformer operational but with fuel flow minimized. If the stack has been taken off-line electrically, the electrocatalytic reactions in the stack will cease, and fuel will pass through the stack unused. At a predetermined temperature, for example 350° C. or 300° C., the fuel flow may be stopped, the reformer may then shut down, and the steam purge commenced.

In a scenario marked by the sudden loss of fuel, a delayed steam purge may still be implemented. Again, the stack may be cooled using process air without significant immediate risk of anode oxidation. The steam purge may be commenced when a temperature less than the normal operating temperature of the stack is reached. However, because the partial pressure of oxygen in the anode may start to increase as a result of seal leakage and backflow through the system, it is not preferred to wait too long before commencing the steam purge.

Alternatively, the steam purge may commence immediately upon loss of fuel, when the stack is at or near operating temperatures. As a result, part of the reformer (assuming nickel catalyst for instance) may become partly oxidized, however, that may serve to protect the anode. In this case, the reformer will be oxidized by the high temperature steam and absorb the brunt of the oxidation damage that may occur, thus, maintaining the oxygen partial pressure downstream from the reformer below the nickel-nickel oxide equilibrium level, and creating a small hydrogen partial pressure, which further serves to protect the anode downstream.

In one embodiment, oxidation induced damage of the reformer may be prevented or mitigated by providing a protective bed of material may be placed between the water injection system (24) and the reformer (20). This bed contains material such as a metallic powder that will oxidize and increase the hydrogen gas partial pressure and decrease the oxygen partial pressure, and thus will protect both the reformer and the cell.

An emergency shutdown of the stack may be required in many different scenarios. For example, power loss may result in loss of controller operation. A leak detection system in the stack vicinity may have detected natural gas. An emergency stop may be activated by an operator, or safety system in response to any abnormal situation.

In an emergency stop, it is not feasible to allow a cooling off period before initiating the steam purge. It is necessary to immediately purge the fuel delivery system with steam to create a safe scenario. The steam purge may continue until the stack has reached a safe temperature, or for a period of time dependent on the amount of water available and/or thermal mass contained in the system capable of safely vaporizing water.

The steam purge of the present invention may be combined with other methods of protecting the anode or with other purge gases. For example, the steam purge may supplement or combined with a nitrogen purge system.

The present description refers to nickel as the metallic component, however, one skilled in the art will understand that the present invention may be applied equally to any anode having a metallic component which must be maintained in a reduced state for efficient fuel cell operation. As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A solid oxide fuel cell stack operative at a temperature of 600° C. to 1000° C. including a fuel delivery subsystem comprising a reformer, an air delivery subsystem capable of cooling the stack prior to purging the fuel delivery subsystem with steam, and having an anode comprising nickel, and a steam purge subsystem comprising:

(a) a water chamber or source connected to the fuel delivery subsystem upstream from the reformer; and (b) a fail-safe mechanism configured to acurate the steam purge subsystem, comprising a salenoid valve connected to a power source, wherein the solenoid valve opens when power to the solenoid is disrupted, and pressurizing means for pressuring the water in a liquid state from the water chamber or source to the fuel delivery system.

2. The apparatus of claim 1 wherein the pressurizing means is contained within the water chamber.

3. The apparatus of claim 1 wherein the pressurizing means comprises a plunger biased with a spring.

4. The apparatus of claim 1 wherein the pressurizing means comprises an expandable resilient water bladder.

5. The apparatus of claim 1 further comprising a protective bed of sacrificial oxidizable material, disposed between the water source and the reformer.

6. The apparatus of claim 5 wherein the sacrificial oxidizable material comprises a metallic powder that upon oxidation increases hydrogen partial pressure and reduces oxygen partial pressure.

7. The apparatus of claim 1 further comprising control means configured to actuate the solenoid valve as a controlled response.

8. The apparatus of claim 7 wherein the controlled response is to a predetermined temperature of the solid oxide fuel cell stack.

9. The apparatus of claim 7 wherein the controlled response is to the elapse of a predetermined amount of time after the solid oxide fuel cell is shut down.

10. The apparatus of claim 7 wherein the controlled response is to a predetermined rate of fuel flow to the solid oxide fuel cell.

* * * * *